United States Patent [19]
Malo

[11] 3,872,798

[45] Mar. 25, 1975

[54] BULKHEAD TROLLEY AND LOCKING DEVICE

[75] Inventor: Lowell L. Malo, St. Peters, Mo.

[73] Assignee: ACF Industries, Incorporated, New York, N.Y.

[22] Filed: Nov. 27, 1973

[21] Appl. No.: 419,399

[52] U.S. Cl. ................................................ 105/376
[51] Int. Cl. .............................................. B60p 7/14
[58] Field of Search .......... 105/376, 404, 396, 378, 105/379

[56] References Cited
UNITED STATES PATENTS
3,593,674 7/1971 Winterfeldt ........................ 105/376
3,641,941 5/1970 Sanders ............................ 105/376

Primary Examiner—Robert S. Ward, Jr.
Assistant Examiner—Richard A. Bertsch
Attorney, Agent, or Firm—Henry W. Cummings

[57] ABSTRACT

In accordance with the present invention, the sprockets and rails with spaced openings are replaced with spaced longitudinally extending trolley rails on opposite sides of the car and rollers riding thereon supporting the bulkheads. In cross section, the shape of the roller is such that the bulkhead becomes largely self-aligning. The rail can readily be manufactured with available parts relatively inexpensively. Since the rollers are not interconnected a wide range of manufacturing and other tolerance variations can be tolerated. A bulkhead locking member is engageable with longitudinally spaced locking means to hold the bulkheads in a desired position in the transportation vehicle. A wide variety of geometrical arrangements and cross-sectional shapes for the supports, trolley rails and rollers may be used to obtain the self-aligning capability.

14 Claims, 8 Drawing Figures

PATENTED MAR 25 1975 3,872,798

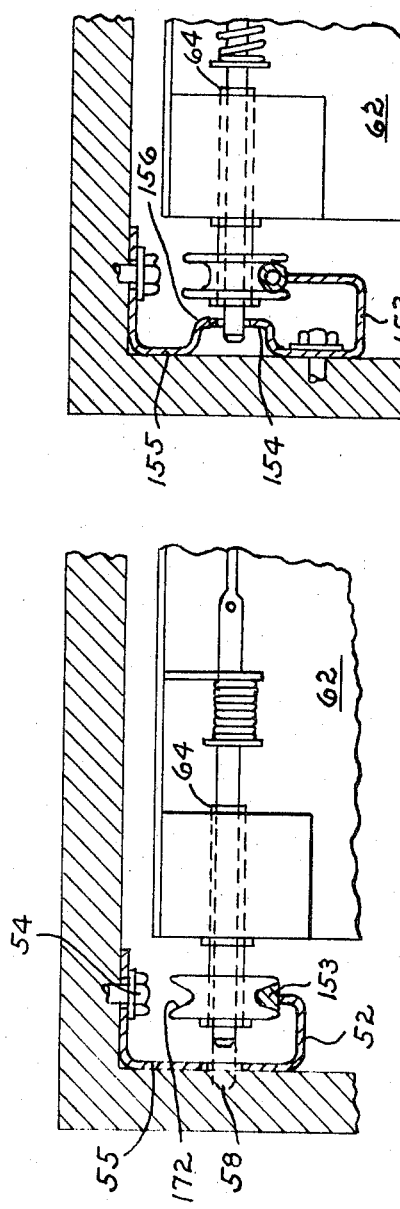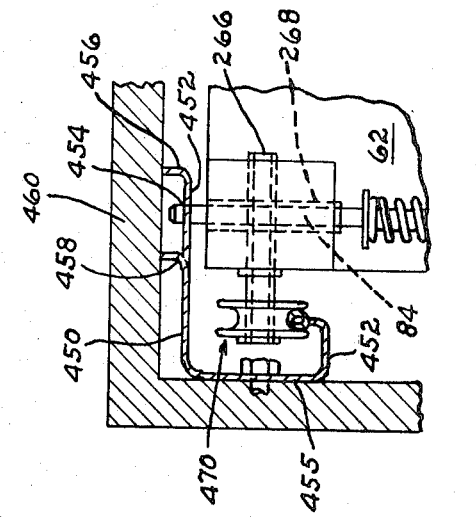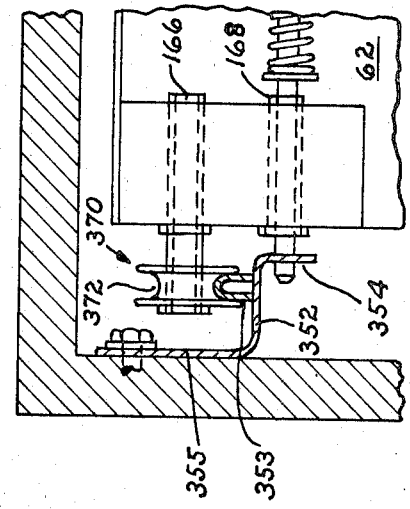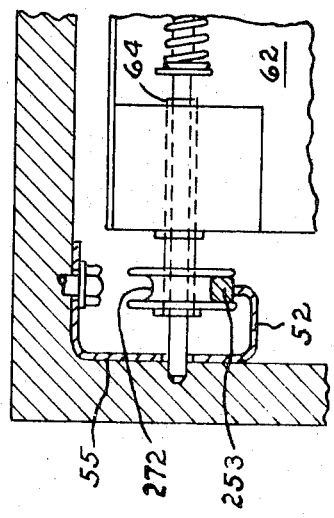

BULKHEAD TROLLEY AND LOCKING DEVICE

BACKGROUND OF THE INVENTION

Bulkheads are more and more common in transportation vehicles, particularly box cars. In order to be moved, a bulkhead rolls along two trolley rails by means of two sprockets engaging spaced openings in the rails. These sprockets often do not mate well with the openings. This alone or in combination with camber and/or twist in the trolley rails often results in high forces required to move the bulkhead in the vehicle. Often the bulkheads become locked in a twisted position and cannot be moved to a different position in the vehicle.

Currently, bulkhead and car manufacturers are calling for higher precision parts in an effort to combat this problem, but this possible solution is costly and has not to date satisfactorily solved this problem.

OBJECT

The object of the present invention is to provide a construction whereby the bulkheads in transportation vehicles, particularly those in railroad cars, can readily be moved back and forth therein, and further the tendency of the bulkheads to become difficult to move and/or locked in a twisted position is substantially reduced and/or avoided.

SUMMARY OF THE INVENTION

In accordance with the present invention, the sprockets and rails with spaced openings are replaced with spaced longitudinally extending trolley rails on opposite sides of the car having rollers riding thereon supporting the bulkheads. In cross section, the shape of the roller is such that the bulkhead becomes largely self-aligning. The rail can readily be manufactured with available parts relatively inexpensively. Since the rollers are not interconnected a wide range of manufacturing and other tolerance variations can be tolerated. A bulkhead locking member is engageable with longitudinally spaced locking means to hold the bulkheads in a desired position in the transportation vehicle. A wide variety of geometrical arrangements for the supports, trolley rails and rollers may be used to obtain the self-aligning capability. The cross-sectional shapes of the trolley rails and rollers also may vary widely. In general the roller is channel-shaped and the cooperating contours of the rails and rollers, for example, may be circular, elliptical, triangular or rectangular.

THE DRAWINGS

FIG. 4 is an enlarged view of another embodiment of the present invention;

FIG. 5 is an enlarged view of another embodiment of the present invention;

FIG. 6 is an enlarged view of another embodiment of the present invention;

FIG. 7 is an enlarged view of another embodiment of the present invention; and

FIG. 8 is an enlarged view of another embodiment of the present invention.

DETAILED DESCRIPTION

Figure 2:
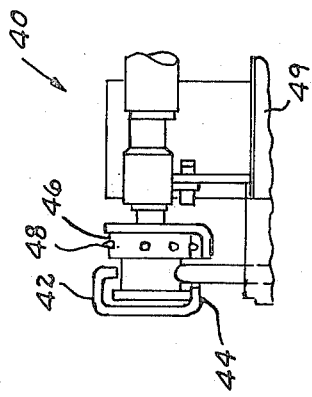
FIG. 2 is an enlarged view of the rail and sprocket prior art arrangement assembly, and locking device in accordance with the present invention.

As shown in the drawings a box car is indicated generally at 10. The box car is provided with conventional trucks 12 having conventional wheels thereon 14. The box car is provided with conventional ends 16 and 18 and sides 20 and 22. Sides 20 and 22 are generally provided with one or more doors indicated respectively at 24 and 26. The doors may be of either the sliding and/or plug door type. The box car is provided with a conventional floor 30 and a conventional roof 32. The box car may be of the insulated type, may be of a refrigerated type and, if desired, it may be provided with an air conditioning system as is commonly utilized in some refrigerator cars.

Figure 1:
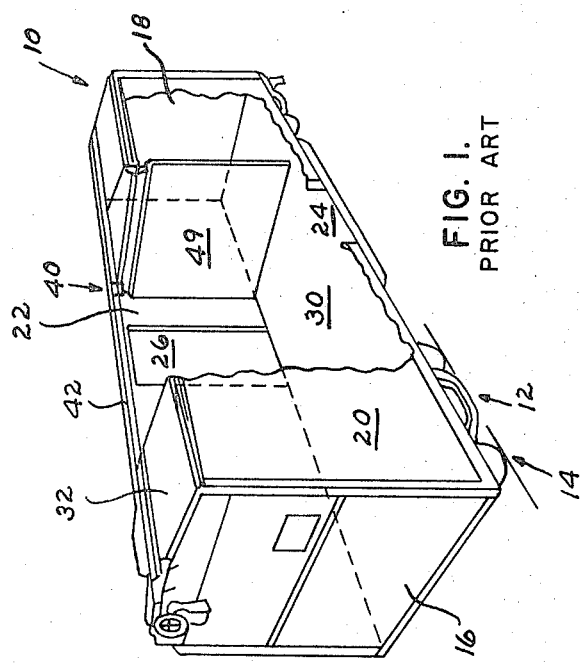
FIG. 1 is a schematic perspective view of a box car utilizing a longitudinally movable bulkhead having a rail and sprocket prior art arrangement for longitudinal bulkhead movement.

As indicated generally at 40 in FIGS. 1 and 2 conventional bulkhead rails 42 are shown provided with openings 44 into which sprocket members 46 and 48 engage in moving the bulkhead 48 longitudinally within the car. The hereinbefore mentioned problems of the lacking of mating tolerances between the sprockets and rail openings and/or the problem of the sprockets becoming misaligned and/or twisted and difficult to move and/or the bulkhead being locked in a twisted position are examples of why this construction has been a problem to the industry.

Figure 3:
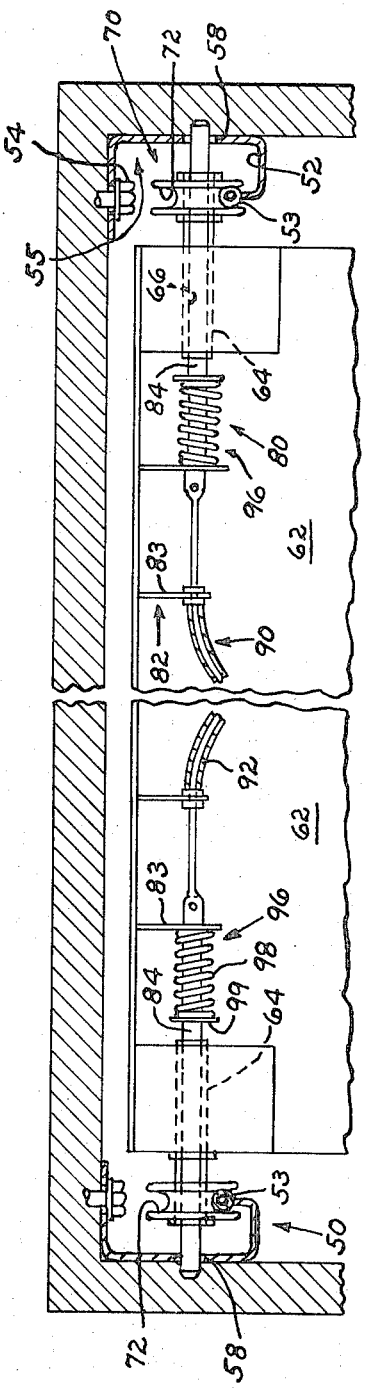
FIG. 3 is an enlarged view of the rail and trolley assembly of the present invention.

In accordance with the present invention this problem is reduced and/or eliminated with the trolley and rail assembly shown in FIG. 3 indicated generally at 50. The assembly comprises a longitudinally extending rail member 52. Rail 52 is mounted upon the upper portion of the car, for example, by means of appropriate fasteners, brazing, or welding 54, for example, to a longitudinally extending support member 55 which, for example, may be channel-shaped in cross section which is appropriately affixed to the car sides and/or roof and/or cross members in the upper section of the car by welding, brazing or appropriate fasteners as indicated at 56. Support members 55 and/or the vehicle side wall or roof are preferably provided with a plurality of longitudinally spaced openings 58 along the length of the car.

One or more bulkheads indicated at 62 are provided in the car. Bulkheads 62 can be made by those skilled in the art according to presently available known constructions. Integrally affixed to bulkheads 62, for example, by welding or mechanical fasteners is a mounting plate or bracket 63 having integral therewith a generally transversely extending bar or rod 64. Bar or rod 64 is preferably hollow as indicated at 66.

Mounted for rotational movement about rod or bar 64 is a trolley member indicated generally at 70. Trolley member 70 is rotatable about shaft 64 and has a surface 72 which cooperates with the contour 53 of the rail member. The geometrical shapes utilized should, at least partly, have the property of rendering the bulkhead self-aligning. The contour of the trolley will be designed to cooperate with the rail member and generally will also be at least partly channel shaped. For example, if the contour of the rail member 53 is circular or elliptical the trolley contour will also be at least partly semicircular or partly elliptical. It is to be emphasized that a wide variety of geometrical arrangements for the rail and trolley assembly may be used. For example, as shown in FIG. 4, a generally triangular shaped arrangement is illustrated with cooperating triangular contours 172 and 153. In FIG. 5, a generally rectangular arrangement is illustrated with cooperating contours 272 and 253. In FIG. 7, a generally U-shaped rail contour 353 cooperates with a trolley 370 having a contour 372, which is generally semicircular. It will thus be apparent to those skilled in the art that a variety of geometrical arrangements may be utilized for the rail and trolley assembly. For many applications it is preferred to utilize the circular cross section illustrated in FIG. 2. It will be apparent that as trolley members 70 on opposite sides of the vehicle are rotated and move along rails 52 the bulkheads 62 can be longitudinally along the car. The rail and trolley assembly utilized on the other side of the car and its cooperating contours 72 and 53 cooperate with the rail and trolley assembly shown to self-align the bulkheads and reduce and/or avoid the problem of the bulkheads being locked in a twisted position which is often encountered in the rail and sprocket arrangements of the prior art.

In accordance with another feature of the present invention, a locking assembly is indicated in FIG. 2 generally at 80. Locking assembly 80 may comprise one or more fastening means 82 to hold the locking means in engagement with the bulkheads. For example, a plurality of brackets shown in the drawings at 83 may be used to mount for transverse movement upon the bulkheads a generally elongated locking member 84. Means are provided indicated generally at 90 for moving locking member 84 of known construction, for example, transversely back and forth. For example, a concentric cable assembly 92 having a fixed external portion 93 and movable internal portion 94 may extend down into the body of the car and be operable by an operator to move locking member 84 between a locked position within openings along the length of vehicle, for example, openings 58 as shown in FIG. 3 or an open position as shown in FIG. 4 wherein locking member 84 is displaced inwardly from the fixed openings. For example, locking member 84 may pass through openings 66 in bar or rod 64.

A resilient means indicated generally at 96 is preferably provided to bias the locking member into the closed position. Resilient means 96 may comprise a coil spring, a leaf spring, compression spring or a rubber-in-shear spring. A coil spring is indicated in FIG. 2 at 98. The spring is held in place by appropriate fasteners and/or brackets, for example as shown in FIG. 2, brackets 99 and 83 affixed to bulkhead 60. Preferably locking members 84 are provided on both sides of the car for engagement with the respective sides of the car as shown in FIG. 3.

FIG. 6 shows a modified support member 155 which is channel-shaped having openings 158 in raised portion 156. Rail 52 is integral therewith.

In FIG. 7 a rod 166 is provided (which need not be hollow) upon which is mounted trolley 370 having a cooperating contour 373. A separate hollow bar or rod 168 is then provided through which locking member 84 passes to engage openings 354 in support 355 having a rail portion 352.

In FIG. 8 a generally horizontal rod 266 is provided upon which is mounted trolley 470. A generally vertical hollow rod 268 is provided through which locking member 84 passes to engage openings 454 in support member 455 having a web portion 452 and flanges 456 and 458 which engage the roof of the car 460. Rail 452 is integral with support 455.

It will thus be apparent that in order to move bulkheads 60 longitudinally in the car, the operator utilizes cable assembly 92 to move locking member(s) 84 inwardly against the bias of resilient means 96 to move locking member 84 from the openings. Then the bulkhead is moved longitudinally in the car by means of trolley 70 moving on rail assembly 50. When the desired position is obtained for the bulkhead in the car, the cable is then released and the bias of resilient means 96 will return locking member(s) 84 into the opening(s) in the new position in the car.

It will be apparent that the self-aligning property of cooperating surfaces greatly tend to reduce the likelihood of the bulkhead becoming difficult to move longitudinally and/or becoming locked into a twisted position and immovable in the car. Furthermore, in one embodiment the locking assembly 80 is conveniently mounted with the rail assembly as shown in FIGS. 3–5.

Individual rail members and supports therefor, and already formed combination rail and support members of various cross sections are readily available. Individual members are easily affixed to supports therefor by welding or mechanical fasteners. It is a simple operation to provide opening and fasteners in the supports and/or vehicle side or roof. Affixing the trolley members to the bulkheads is readily accomplished by welding or mechanical fasteners, and the locking member(s) are easily mounted on the bulkheads.

What is claimed is:

1. A railway box car comprising: fixed rail asemblies mounted upon a fixed upper portion of opposite sides of the box car; said rail assemblies each having a longitudinally extending rail having a rail contour which cooperates with a contour on a rotatable bulkhead trolley; said bulkhead trolleys rotatably mounted upon a hollow member mounted on a bulkhead adapted for longitudinal movement in the box car; said bulkhead trolleys having a channel contour adapter to engage said rail contour; means for maintaining said bulkhead in a desired position within the box car comprising at least one locking member mounted on the bulkhead for transverse movement within said hollow member and being resiliently biased to engage openings in a fixed portion of the car in a plurality of positions in the car; and actuating means to overcome the resilient bias of said locking member by an operator in the box car.

2. A railway box car according to claim 1 wherein said rail contour has a circular cross section and said trolley contour has an at least partly semicircular cross section.

3. A railway box car according to claim 1 wherein said rail contour has a triangular cross section and said trolley contour has an at least partly triangular cross section.

4. A railway box car according to claim 1 wherein said rail contour has a rectangular cross section and said trolley contour has an at least partly rectangular cross section.

5. A box car according to claim 1 wherein locking members are provided on both sides of the bulkhead to engage fixed portions of the car on both sides thereof.

6. A box car assembly according to claim 1 wherein said rail assembly comprises at least one support member integral with said rail.

7. A box car assembly according to claim 6 wherein said support member is provided with openings for engaging said locking member.

8. A railway box car comprising:

fixed rail assemblies mounted upon a fixed upper portion of opposite sides of the box car; said rail assemblies each having a longitudinally extending rail having a rail contour in cross section which cooperates with a contour on a rotatable bulkhead trolley; said bulkhead trolleys rotatably mounted upon a first shaft mounted on bulkhead adapted for longitudinal movement in the box car; said bulkhead trolleys having a channel contour engaging said rail contour; means for maintaining said bulkhead in a desired position within the box car comprising at least one locking member mounted on the bulkhead for movement within a second shaft disposed horizontally and spaced generally below said first shaft; said locking member being resiliently biased to engage openings in a fixed portion of the car in a plurality of positions in the car; and actuating means to overcome the resilient bias of said locking member by an operator in the box car.

9. A railway box car according to claim 8 wherein said rail contour has a circular cross section and said trolley contour has an at least partly semicircular cross section.

10. A railway box car according to claim 8 wherein said rail contour has a triangular cross section and said trolley contour has an at least partly triangular cross section.

11. A railway box car according to claim 8 wherein said rail contour has a rectangular cross section and said trolley has an at least partly rectangular cross section.

12. A railway box car according to claim 8 wherein locking members are provided on both sides of the bulkhead to engage fixed portions of the car on both sides thereof.

13. A railway box car according to claim 8 wherein said rail assembly comprises at least one support member integral with said rail.

14. A railway box car according to claim 13 wherein said support member is provided with openings for engaging said locking member.

* * * * *